UNITED STATES PATENT OFFICE 2,628,063

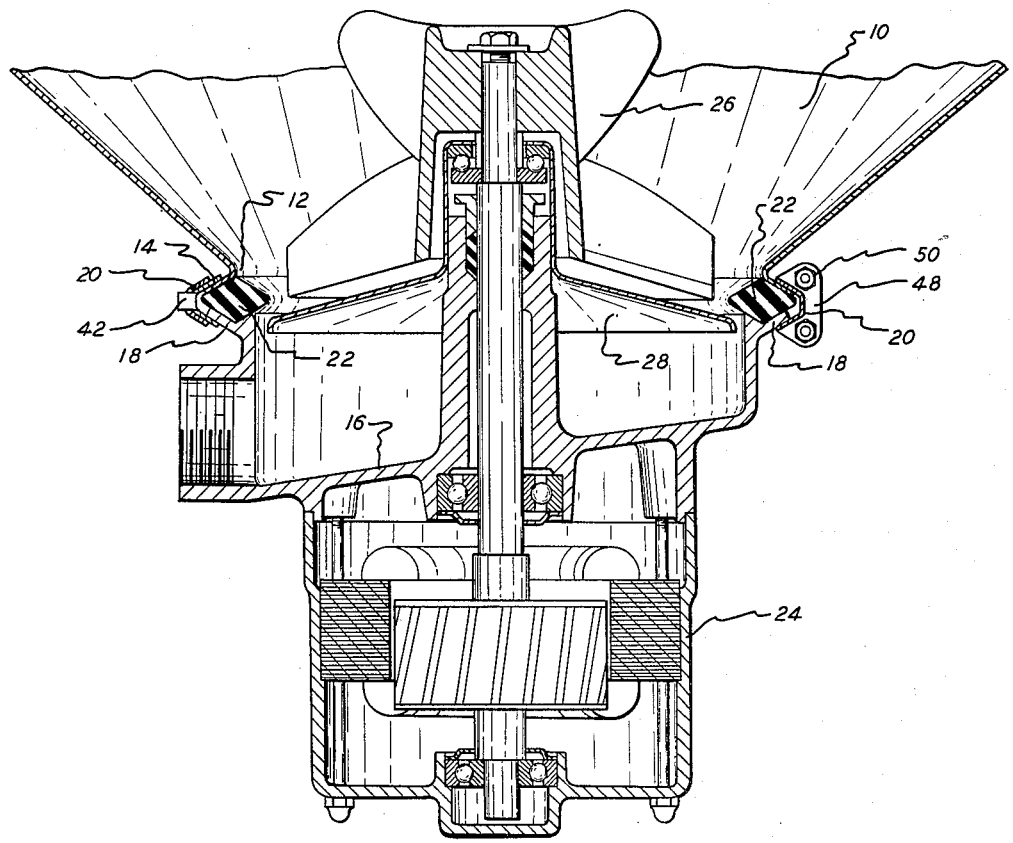
Fig. I.

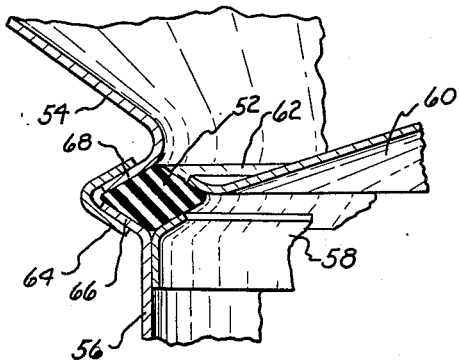
Fig. II.
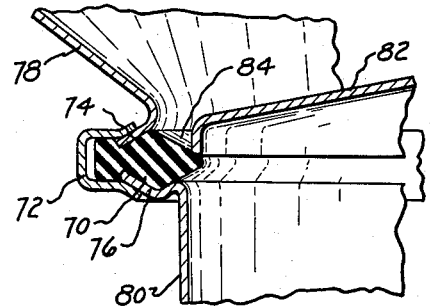
Fig. III.
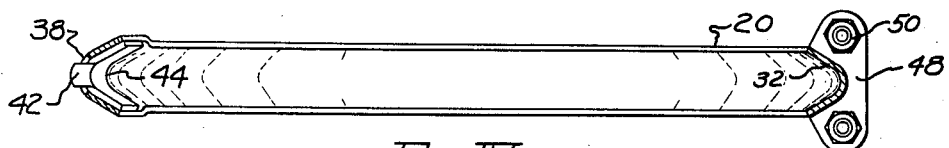
Fig. IV.
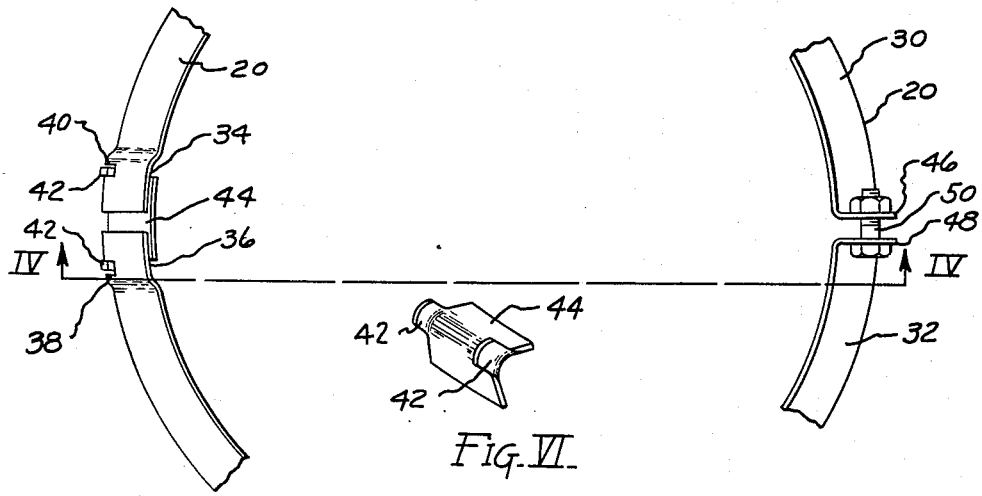
Fig. V.
Fig. VI.
Inventor
CHARLES HOLLERITH
By Beaman & Langford
Attorneys

VALVE SEAT FOR DISHWASHERS

Charles Hollerith, Jackson, Mich., assignor to Lake State Products, Inc., Jackson, Mich., a corporation of Michigan Application December 29, 1945, Serial No. 638,318

1 Claim. (Cl. 251—167)

The present invention relates to improvements in dishwasher construction and the like, in which a tub or container is provided with a central drain opening and the liquid impeller and drain valve structure is mounted as a unit and operates within the central opening of the tub. For a disclosure of subject device, reference may be had to co-pending application, Serial No. 638,273, filed December 29, 1945.

In order to expedite the assembly and to facilitate the repair and maintenance of an apparatus of the above-mentioned type, a combination gasket and seat has been developed which is clamped between the tub structure and the motorized unit to perform the dual function of sealing the joint between the unit and the tub and at the same time providing a seat for the drain valve.

Thus, one of the objects of the present invention is to provide an improved gasket and seat element and associated structure for use in dishwashers and the like of the type described.

Another object of the invention is to provide a combination seal and seat for the drain valve for dishwashers and the like of the type described.

These and other objects and advantages residing in the specific details of construction and arrangement of a clamping band in the shape and form of the sealing gasket will more fully appear from a consideration of the following specification and the appended claim.

In the drawings,

Fig. 1 is a vertical cross-sectional view through center portion of a dishwasher embodying the present invention, some of the associated parts being shown in side elevation, Fig. 2 is a fragmentary sectional view of another form, supporting its structure with a gasket, Fig. 3 is a view similar to Fig. 4 with a further modification in the invention, showing a different shape of gasket and associated structure for supporting the same, Fig. 4 is a sectional view through the clamping band, taken on the line IV—IV of Fig. 5, Fig. 5 is a fragmentary plan view of the clamping band shown in the form of the invention illustrated in Fig. 1, and Fig. 6 is a perspective view through the connecting link for the adjustable fan.

The container or vat 10 of a dishwasher or other similar apparatus is shown fabricated from sheet metal with an opening 12 defined by an outwardly turned flange 14. The sump 16 has an outwardly turned flange 18. An adjustable clamping ring 20, to be more fully described hereinafter, clamps the flanges 18 and 14 on the gasket and seat ring 22.

The motor 24 is supported from the sump 16 and has a drive shaft on which the impeller 26 and drain valve 28 are carried for vertical movement to open and close the drain valve 28 in a manner more fully disclosed in my co-pending application Serial No. 638,314, filed December 29, 1945.

As more clearly shown in Figs. 4 to 6, inclusive, the adjustable band 20 comprises identical sheet metal sections 30 and 32, having offset portions 34 and 36, perforated at 38 and 40 to receive the tabs 42 of the connecting member 44. The opposite ends of members 30 and 32 have flanges 46 and 48 apertured to receive the adjustment bolts 50. It is to be understood that the members 30 and 32 are semi-circular in plan view and are V-shaped in cross section as shown in Fig. 4.

In the form of the invention shown in Fig. 2, the gasket and seat member 52 is shown sealing a joint between two sheet metal parts 54 and 56. Welded or otherwise secured to the part 56 is a flanged member 58 to give support to the member 52 in opposition to the closing pressure of the valve part 60 which engages with the surface 62 as a seat. The clamping band 64 may be similar to that shown in Figs. 4 to 6, inclusive, and functions to clamp the flanges 66 and 68 upon the member 52 to hold the parts in assembled relation and to seal the joint between the parts 54 and 56.

In the form of the invention shown in Fig. 3, the gasket and seat member 70 is of slightly different shape than that shown in Fig. 2. Likewise, the adjustable clamping band 72 is slightly different in shape in cross section but may otherwise conform in construction to that shown in Figs. 4 to 6, inclusive. The band is shown clamping the flanges 74 and 76 against the member 70 to seal the joint between the parts 78 and 80. The valve member 82 is shown engaging with the seat portion 84 of the member 70. It will be understood that the valve 82 is raised and lowered relative to the seat 84 in the manner that may be similar to that disclosed in my aforesaid co-pending application. The member 78 may be part of the tub or vat of a dishwashing apparatus or the like, while the member 80 may form the drain sump controlled by the valve 82. The gasket and seat members 52 and 70 may be of rubber, either natural or artificial, or other suitable material, preferably non-metallic, capable of being moulded or otherwise formed into an endless ring. Also, many other shapes and forms of gaskets may be used.

Having thus described my invention, what I claim as new and desire to be covered by Letters Patent is:

In combination with a pair of separate hollow casing parts defining a fluid flow opening, an annular unitary sealing gasket and valve seat member disposed between said parts and projecting into said opening, said member being of resilient material and diamond shape in cross-section, one of said parts having an annular V-groove in which adjacent first and second sides of said member are supported with one of said sides extending beyond said groove into said flow opening, the other of said parts having an annular outwardly flared portion engaging a third side of said member, means for clamping said parts together with said member being confined between said V-groove and said flared portion to provide a sealed joint between said parts, said other part having a portion oppositely flared with respect to said first flared portion and substantially located in the extension of the same surface as the fourth side of said member, said side of said member projecting beyond said V-groove and into said fluid flow opening defining an annular valve seat portion.

CHARLES HOLLERITH.

REFERENCES CITED

The following references are of record in the file of this patent:

UNITED STATES PATENTS

| Number | Name | Date |
| --- | --- | --- |
| 317,710 | Blesch | May 12, 1885 |
| 987,218 | Cordley | Mar. 21, 1911 |
| 1,338,172 | Coffield | Apr. 27, 1920 |
| 1,376,216 | Mittinger | Apr. 26, 1921 |
| 1,508,694 | Gunn | Sept. 16, 1924 |
| 1,609,580 | Sinclair | Dec. 7, 1926 |
| 1,947,257 | Fritz | Feb. 13, 1934 |
| 2,478,350 | Wirz | Aug. 9, 1949 |